(12) United States Patent
Maloisel et al.

(10) Patent No.: US 8,114,280 B2
(45) Date of Patent: Feb. 14, 2012

(54) SEPARATION MATRIX AND METHOD OF PURIFICATION

(75) Inventors: Jean-Luc Maloisel, Uppsala (SE);
Bo-Lennart Johansson, Uppsala (SE);
Gunnar Glad, Uppsala (SE); Nils Norrman, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 945 days.

(21) Appl. No.: 11/570,530

(22) PCT Filed: Jun. 22, 2005

(86) PCT No.: PCT/SE2005/001002
§ 371 (c)(1),
(2), (4) Date: Dec. 13, 2006

(87) PCT Pub. No.: WO2006/001771
PCT Pub. Date: Jan. 5, 2006

(65) Prior Publication Data
US 2007/0196858 A1    Aug. 23, 2007

(30) Foreign Application Priority Data

Jun. 24, 2004  (SE) ..................................... 0401665

(51) Int. Cl.
*B01D 15/08* (2006.01)
(52) U.S. Cl. .................... 210/198.2; 210/635; 210/656; 210/502.1
(58) Field of Classification Search ............... 210/502.1, 210/635, 656, 659, 198.2
See application file for complete search history.

(56) References Cited

U.S. PATENT DOCUMENTS

| | | | | |
|---|---|---|---|---|
| 4,725,355 | A | * | 2/1988 | Yamamoto et al. ........... 210/266 |
| 6,117,996 | A | * | 9/2000 | Lowe et al. .................... 544/216 |
| 6,498,236 | B1 | | 12/2002 | Lihme et al. |
| 6,702,943 | B1 | | 3/2004 | Johansson et al. |

FOREIGN PATENT DOCUMENTS

WO    WO03/046063    6/2003

OTHER PUBLICATIONS

Nilsson, K, et al., "p-Toluenesulfonyl Chloride as an Activating Agent of Agarose for the Preparation of Immobilized Affinity Ligands and Proteins", Eur. J. Biochem., vol. 112, 1980, p. 397-402.
Peng, L., et al., "Evaluation of Activation Methods with Cellulose Beads for Immunosorbent Purification of Immunoglobulins", Journal of Biotechnology, vol. 4, 1987, p. 255-265.
Liu, Y., et al., "Novel Sulfamethazine Ligand Used for One-Step Purification of Immunoglobulin G from Human Plasma", Journal of Chromatography B, vol. 792, 2003, p. 177-185.
Porath, J., et al., "Thiophilic Adsorption—A New Method for Protein Fractionation", FEBS, vol. 185, No. 2, 1985, p. 306-310.

(Continued)

*Primary Examiner* — Ernest G Therkorn (57) ABSTRACT

The present invention relates to a separation matrix comprised of a porous support to which ligands have been immobilized, wherein said ligands comprise at least one sulphonamide and the R group of the sulphonyl comprises an aromatic group. The nitrogen of the sulphonamide may be a secondary or tertiary amine. The invention also relates to a chromatography column that contains the described separation matrix, as well as to a method of isolating immunoglobulin-like compounds by adsorption to the separation matrix.

10 Claims, 8 Drawing Sheets

OTHER PUBLICATIONS

Knudsen, K., et al., "Sulfone-Aromatic Ligands for Thiophilic Adsorption Chromatography: Purification of Human and Mouse Immunoglobulins", Analytical Biochemistry, vol. 201, 1992, p. 170-177.

Porath, J., et al., "A New Kind of "Thiophilic" Electron-Donor-Acceptor Adsorbent", Makromol Chem., Macromol. Symp., vol. 17, 1988, p. 359-371.

Schwarz, A., et al., "Novel Herterocyclic Ligands for the Thiophilic Purification of Antibodies", Journal of Chromatography B, vol. 664, 1995, p. 83-88.

Hjerten, S., "The Preparation of Agarose Spheres for Chromatography of Molecules and Particles", Biochimica ET Biophysica Acta, vol. 79, No. 2, 1964, p. 393-398.

Arshady, R., "Styrene Based Polymer Supports Developed by Suspension Polymerization", La Chimica E L' Industria, vol. 70, No. 9, 1988, p. 70-75.

Hermanson, G., et al., Immobilized Affinity Ligand Techniques, 1992, Academic Press, Inc., USA.

* cited by examiner

Cl-cap: 9 μmol/mL

L1C

Cl-cap: 11 μmol/mL

Cl-cap: < 3 μmol/mL

L2C

Cl-cap: < 3 μmol/mL

SEPARATION MATRIX AND METHOD OF PURIFICATION

REFERENCE TO RELATED APPLICATIONS

This application is a 371 of PCT/SE05/01002 filed Jun. 22, 2005.

TECHNICAL FIELD

The present invention relates to the field of separation of bio-molecules from liquids, such as antibody purification, and more specifically to a separation matrix suitable for purification of antibodies. The invention also encompasses a chromatography column that comprises the novel matrix and a method of isolating antibodies.

BACKGROUND

The immune system is composed of many interdependent cell types that collectively protect the body from bacterial, parasitic, fungal, viral infections and from the growth of tumour cells. The guards of the immune system are macrophages that continually roam the bloodstream of their host. When challenged by infection or immunisation, macrophages respond by engulfing invaders marked with foreign molecules known as antigens. This event, mediated by helper T cells, sets forth a complicated chain of responses that result in the stimulation of B-cells. These B-cells, in turn, produce proteins called antibodies, which bind to the foreign invader. The binding event between antibody and antigen marks the foreign invader for destruction via phagocytosis or activation of the complement system. Five different classes of antibodies, or immunoglobulins, exist: IgA, IgD, IgE, IgG, and IgM. They differ not only in their physiological roles but also in their structures. From a structural point of view, IgG antibodies are a particular class of immunoglobulins that have been extensively studied, perhaps because of the dominant role they play in a mature immune response.

The biological activity, which the immunoglobulins possess, is today exploited in a range of different applications in the human and veterinary diagnostic, health care and therapeutic sector. In fact, in the last few years, monoclonal antibodies and recombinant antibody constructs have become the largest class of proteins currently investigated in clinical trials and receiving FDA approval as therapeutics and diagnostics. Complementary to expression systems and production strategies, purification protocols are designed to obtain highly pure antibodies in a simple and cost-efficient manner.

Traditional methods for isolation of immunoglobulins are based on selective reversible precipitation of the protein fraction comprising the immunoglobulins while leaving other groups of proteins in solution. Typical precipitation agents being ethanol, polyethylene glycol, lyotropic i.e. anti-chaotropic salts such as ammonium sulphate and potassium phosphate, and caprylic acid. Typically, these precipitation methods are giving very impure products while at the same time being time consuming and laborious. Furthermore, the addition of the precipitating agent to the raw material makes it difficult to use the supernatant for other purposes and creates a disposal problem, which is particularly relevant when speaking of large-scale purification of immunoglobulins.

Ion exchange chromatography is another well-known method of protein fractionation frequently used for isolation of immunoglobulins. However, since the charged ion exchange ligands will react with all oppositely charged compounds, the selectivity of ion exchange chromatography may be somewhat lower than other chromatographic separations.

Protein A and Protein G affinity chromatography are popular and widespread methods for isolation and purification of immunoglobulins, particularly for isolation of monoclonal antibodies, mainly due to the ease of use and the high purity obtained. Used in combination with ion exchange, hydrophobic interaction, hydrxyapatite and/or gel filtration steps, especially protein A-based methods have become the antibody purification method of choice for many biopharmaceutical companies. However, despite their common usage, there is a growing need and demand for effective alternatives addressing familiar problems associated with protein A-based media, such as cost, leakage and instability at increased pH values.

Hydrophobic interaction chromatography (HIC) is also a method widely described for isolation of immunoglobulins. However, hydrophobic matrices require an addition of lyotropic salts to the raw material to make the immunoglobulin bind efficiently. The bound antibody is released from the matrix by lowering the concentration of lyotropic salt in a continuous or stepwise gradient. If a highly pure product is the object, it is recommended to combine the hydrophobic chromatography with a further step. Thus, a disadvantage of this procedure is the necessity to add lyotropic salt to the raw material as this gives a d problem and thereby increased cost to the large-scale user. For other raw materials than cell culture supernatants such as whey, plasma, and egg yolk the addition of lyotropic salts to the raw materials would in many instances be prohibitive in large-scale applications as the salt could prevent any economically feasible use of the immunoglobulin depleted raw material. An additional problem in large-scale applications would be the disposal of several thousand liters of waste.

Thiophilic adsorption chromatography was introduced by J. Porath in 1985 (J. Porath et al; FEBS Letters, vol. 185, p. 306, 1985) as a new chromatographic adsorption principle for isolation of immunoglobulins. In this paper, it is described how divinyl sulphone activated agarose coupled with various ligands comprising a free mercapto-group show specific binding of immunoglobulins in the presence of 0.5 M potassium sulphate, i.e. a lyotropic salt. It was postulated that the sulphone group, from the vinyl sulphone spacer, and the resulting thioether in the ligand was a structural necessity to obtain the described specificity and capacity for binding of antibodies. It was however later shown that the thioether could be replaced by nitrogen or oxygen if the ligand further comprised an aromatic radical (K. L. Knudsen et al, Analytical Biochemistry, vol. 201, p. 170, 1992). Although the matrices described for thiophilic chromatography generally show good performance, they also have a major disadvantage in that it is needed to add lyotropic salts to the raw material to ensure efficient binding of the immunoglobulin, which is a problem for the reasons discussed above.

Other thiophilic ligands coupled to epoxy activated agarose have been disclosed in (J. Porath et. al. Makromol. Chem., Makromol. Symp., vol. 17, p. 359, 1988) and (A. Schwarz et. al., Journal of Chromatography B, vol. 664, pp. 83-88, 1995), e.g. 2-mercaptopyridine, 2-mercaptopyrimidine, and 2-mercaptothiazoline. However, all these affinity matrices still have inadequate affinity constants to ensure an efficient binding of the antibody without added lyotropic salts.

U.S. Pat. No. 6,498,236 (Upfront Chromatography) relates to isolation of immunoglobulins. The method disclosed involves the steps of contacting a solution that comprises a negatively charged detergent and contains immunoglobulin(s) with a solid phase matrix, whereby at least a part of the immunoglobulins becomes bound to the solid phase matrix; and contacting the solid phase matrix with an eluent in order to liberate the immunoglobulin(s) from the solid phase matrix. The immunoglobulin-containing solution is further characterised by having a pH in the range of 2.0 to 10.0, a total salt content corresponding to an ionic strength of at the most 2.0, and lyotropic salts in a concentration of at the most 0.4 M. The detergent present in the solution is believed to suppress the adherence of other biomolecules to the matrix, and may be exemplified by octyl sulphate, bromphenol blue, octane sulphonate, sodium laurylsarcosinate, and hexane sulphonate. The solid phase matrix is defined by the formula M-SP1-L, wherein M designates the matrix backbone; and SP1 designates a ligand comprising a mono- or bicyclic aromatic or heteroaromatic moiety.

Liu et al (Yang Liu, Rui Zhao, Dihua Shangguan, Hongwu Zhang, Guoquan Liu: Novel sulphmethazine ligand used for one-step purification of immunoglobulin G from human plasma, Journal of Chromatography B, 792 (2003) 177-185) investigated the affinity of sulphmethazin (SMZ) to human IgG. Thus, a ligand is disclosed, which comprises a sulphonyl group wherein the R group is a heterocyclic ring. According to this article, SMZ was immobilised on monodisperse, non-porous, cross-linked poly(glycidyl methacrylate) beads. The beads were then used in high-performance affinity chromatography for isolation of IgG from human plasma. Maximal adsorption was achieved at pH 5.5. The beads presented minimal non-specific interaction with other proteins. Thus, the ligands were capable of adsorbing antibodies, while their interaction with other proteins was just sufficient to provide retardation thereof in the adsorption buffer used. However, as is well known, ester compounds such as methacrylate are easily hydrolysed at increased pH values. Consequently, similar to Protein A and Protein G matrices, the therein disclosed separation matrix would be expected to unstable at the commonly used cleaning in place (cip) procedures.

U.S. Pat. No. 4,725,355 (Terumo Kabushiki Kaisha) relates to a body fluid purification medium and apparatus, and more specifically to a support having an adsorbent fixed thereto for use to remove pathogenic substances such as plasma proteins in a body fluid. According to U.S. Pat. No. 4,725,355, in order to perform extracorporeal blood purification therapy when treating a patient, it is preferable that a pathogenic substance be eliminated at a still higher efficiency and adverse influences on the blood be extremely small. The adsorbent provided according to U.S. Pat. No. 4,725,355 includes at least one sulfa drug. According to U.S. Pat. No. 4,725,355, the azole ring in a sulfa drug exhibits a hydrophobic property, while the hetero atom in the ring has a lone pair of electrons and serves as a protein acceptor. The sulphonamide portion of the sulfa drug is stated to have hydrogen bondability.

Thus, there is still a need of alternative methods for purification of antibodies or antibody constructs, which observe the demands of purity, safety, potency and cost effectiveness.

SUMMARY OF THE PRESENT INVENTION

Accordingly, one object of the present invention is to provide a separation matrix, which enables adsorption of antibodies at low ionic strengths at pH values around neutral. This can be achieved by the separation matrix as defined in claim 1.

Another object of the present invention is to provide a separation matrix, which enables highly selective adsorption of antibodies.

A specific object of the present invention is to provide a separation matrix to which antibodies are adsorbed, while other proteins are allowed to pass without any essential interaction.

A further object of the present invention is to provide a process of preparing a matrix for separation of antibodies, which comprises functional groups that enable adsorption of antibodies by thiophilic, hydrophobic and/or hydrogen bond interactions, which method makes it easy to vary the ligand structure.

Yet another object of the invention is to provide a method of isolating antibodies from a liquid by adsorption thereof to a separation matrix, which method does not require any addition of detergent to achieve adsorption.

Further objects and advantages will appear from the detailed description that follows.

DEFINITIONS

The terms "antibody" and "immunoglobulin" are used herein interchangeably.

The term "ligand" means herein molecules or compounds capable of interaction with target compounds, such as antibodies.

The term "spacer arm" means herein an element that distances a ligand from the support of a separation matrix.

A "primary amine" is defined by formula $RNH_2$, wherein R denotes an organic group.

A "secondary amine" is defined by formula $R_2NH$, wherein R denotes an organic group.

A sulphonyl group is defined by formula $—S(=O)_2R$, wherein R denotes an organic group.

The term "aromatic" group refers to a group, wherein the number of $\pi$ electrons can be calculated according to Huckels rule: (4n+2), wherein n is a positive integer or zero.

The term "aromatic sulphonamide" refers to a sulphonamide wherein the R group comprises one or more aromatic groups.

The term "bicyclic" and "tricyclic" means that the residue comprises two or three rings, respectively. Said rings may be fused rings or separate rings. Likewise, a residue comprising any further number of rings can be comprised of fused or separate rings.

The term "protonatable" group means a group capable of adding a hydrogen.

The term "affinity group" refers to a pair of affinity members, which specifically bind to each other in a biological kind of "lock/key" interaction. Well known affinity pairs are for example enzymes and their respective receptors; biotin and avidin; and Protein A/antibodies.

The term "surface" when used in the context of a porous support embraces the pore surfaces as well as to the actual outer surfaces.

The term "eluent" is used in its conventional meaning in this field, i.e. a buffer of suitable pH and/or ionic strength to release one or more compounds from a separation matrix.

DETAILED DESCRIPTION OF THE INVENTION

In a first aspect, the present invention is a separation matrix comprised of a porous support to which ligands have been immobilised, optionally via spacer arms, wherein said ligands comprise one or more sulphonamides and the R group of the sulphonyl comprises one or more aromatic groups.

In an advantageous embodiment, the invention is a separation matrix comprised of a porous support to which ligands have been immobilised, optionally via spacer arms, wherein the ligands comprise one or more aromatic sulphonamides and are substantially devoid of protonatable groups. In this context, the term "substantially devoid of protonatable groups" is understood to mean that no such groups constitute part of the ligand, and hence that the interaction with a target molecule does not involve protonatable groups to any substantial extent.

In one embodiment, said ligands comprise at least one primary or secondary amine.

The separation matrix can be used for isolation, such as purification or analysis, of antibodies and other compounds that exhibit equivalent binding properties, such as fusion proteins comprising an immunoglobulin part or antibody fragments. The present inventors have shown that antibodies can be purified at a high capacity and with an excellent selectivity using a separation matrix that comprises one or more sulphonamides. Contrary to the above discussed U.S. Pat. No. 6,498,236; the present invention achieves purification without any need of adding detergent to the liquid that comprises antibodies before its contact with the matrix using uncharged ligands. Further, as shown in the experimental part below, the present invention allows adsorption of immunoglobulin, while three different model proteins were not adsorbed at the same conditions. This selectivity makes the herein described aromatic sulphonamide ligands extremely valuable for the purification of monoclonal antibodies.

As is well known, a sulphonamide is comprised of an amine, wherein at least one of the R groups of said amine is a sulphonyl group. The present inventors have shown that by including a sulphonamide, wherein the sulphonyl R group is aromatic, in the ligand, the present separation matrix will exhibit enhanced binding properties. Thus, in the most preferred embodiment, the R group comprises at least one aromatic group.

Further, in one embodiment, the R group of the sulphonyl is a substituted or unsubstituted aromatic or heteroaromatic group, such as a mono- or polyaromatic group. More specifically, the R group may e.g. be monocyclic, bicyclic or tricyclic. Examples of aromatic residues are phenyl; benzyl; benzoyl; naphtyl; and tosyl. Heteroaromatic groups may comprise one or more of the heteroatoms N, O, and S, and may be exemplified e.g. by thienyl; furyl; and pyridyl.

In one embodiment, the substituents are electron withdrawing. The substituents may be single atoms, such as halogens or carbon atoms; or groups, such as $-N(O)_2$. The substituents may alternatively be linear or branched carbon chains.

Likewise, the sulphonamide ligand may comprise further substituents. As the skilled person in this field will realise, the nature of the substituents may be utilised to enhance the binding properties of the ligands. However, it is also understood that the nature and size of the ligand, especially of the R group and its substituents, should be selected so as not to inhibit, e.g. by steric hindrance, the binding of a target molecule, such as an antibody.

In a specific embodiment, the R group of the sulphonyl comprises one or more aliphatic groups in addition to the aromatic group(s).

In one embodiment of the present separation matrix, the ligands are sulphonylated monoamines. In an alternative embodiment, the ligands are sulphonylated polyamines. Such sulphonylated polyamines may comprise any convenient number of amines, such as 2-10. In an illustrative embodiment, each polyamine comprises 2-6 amines. In another embodiment, the ligands comprise more than one sulphonyl group. Such further sulphonyl groups may be part of the R group of the sulphonamide; and/or form a part of a spacer arm that connects the ligand with the support.

In a specific embodiment of the present separation matrix, the ligands are present as repetitive units of a polymer immobilised to the support. The polymer may be any suitable polyamine, such as polyalkyleneimine. In one embodiment, the polymer is a polyethylene amine. As the skilled person in this field will realise, the amine content of such a polymer may be varied, e.g. to comprise primary and/or secondary amines in any desired order. Thus, in one embodiment, the polymer exhibit two or more different ligand groups. The polymers are easily produced from suitable monomers according standard methods in this field. Methods of coupling the polyamines to a support are also well known and easily performed by the skilled person in this field, for example by in situ polymerisation or grafting of polymers, see e.g. PCT/SE02/02159 (Ihre et al). An advantage of this embodiment is that it enables convenient optimisation of the properties of the separation matrix, e.g. by variation of the polymer length, branching etc. Alternatively, the polyamines are coupled to the support via the sulphur of sulphonyl groups.

However, the separation matrix according to the present invention may also comprise one or more aromatic sulphonamide ligands in combination with other functional groups. Thus, in one embodiment, the ligands of the separation matrix are multi-modal ligands in the sense that they are capable of interacting with the target using two or more functions. The additional or secondary functional group can be easily introduced, for example via the introduction of different substituents on the sulphonamide group, or via a spacer, or by alkylation of the nitrogen atom of the sulphonamide group or simply by a stochastic approach by introducing new ligands (two or more different ligand structures) on the above-described sulphonamide matrix. Additional functional groups are, for example, selected from the group consisting of aromatic group; heterocyclic and aliphatic groups; H-bond donor and acceptor-containing groups; chargeable functional groups such as amines and acidic groups; poly hydroxylated groups such as dextran; polyethylene glycol derivatives; and fluorine atom-containing groups.

Thus, in one embodiment, the present separation matrix is comprised of a porous support onto which ligands comprising one or more aromatic sulphonamides as well as ion-exchanging groups have been immobilised. Thus, this embodiment may be denoted a sulphonamide-based ion exchange separation matrix.

In another embodiment, the separation matrix is a multi-mode sulphonamide-based separation matrix, which comprises one or more aromatic sulphonamides combined with at least one additional functional group selected from the group consisting of hydrophobic interaction chromatography (HIC) groups; ion exchange groups; affinity groups; and metal chelating groups. In one embodiment, the aromatic sulphonamide group(s) of the ligand are protonatable or non-protonatable.

The porous support of the present separation matrix may be of any suitable material. In one embodiment, the support is comprised of a cross-linked carbohydrate material, such as agarose, agar, cellulose, dextran, chitosan, konjac, carrageenan, gellan, alginate etc. The support can easily be prepared according to standard methods, such as inverse suspension gelation (S Hjertén: Biochim Biophys Acta 79(2), 393-398 (1964). Alternatively, the support is a commercially available product, such as Sepharose™ FF (Amersham Biosciences AB, Uppsala, Sweden). Thus, in one embodiment of the present matrix, the support is a cross-linked polysaccharide. In a specific embodiment, said polysaccharide is agarose. Such carbohydrate materials are commonly allylated before immobilisation of ligands thereof. In brief, allylation can be carried out with allyl glycidyl ether, allyl bromide or any other suitable activation agent following standard methods.

In an alternative embodiment, the porous support of the present separation matrix is comprised of cross-linked synthetic polymers, such as styrene or styrene derivatives, divinylbenzene, acrylamides, acrylate esters, methacrylate esters, vinyl esters, vinyl amides etc. Supports of such polymers are easily produced according to standard methods, see e.g. "Styrene based polymer supports developed by suspension polymerization" (R Arshady: Chimica e L'Industria 70(9), 70-75 (1988)). Alternatively, a commercially available product, such as Source™ (Amersham Biosciences AB, Uppsala, Sweden) can be surface-modified according to the invention. However, in this embodiment, the surface of the support is preferably modified to increase its hydrophilicity, usually be converting the majority of the exposed residual double bonds to hydroxyl groups.

In one embodiment, the ligands are immobilised to extenders, or a coating polymer layer, present on the surface of the porous support. Such extenders, also known as "flexible arms", may be organic or synthetic polymers. Thus, the support may e.g. be coated with dextran, to provide a hydrophilic nature to the support, to which the ligands are immobilised according to well known methods in this field.

The present separation matrix may be in any suitable form, such as a chromatography matrix, e.g. in the form of essentially spherical particles or a monolith; a filter or membrane; a chip, a surface, capillaries or the like. Thus, the present invention also encompasses a chromatography column packed with a separation matrix as described above. In an advantageous embodiment, the column is made from any conventional material, such as a biocompatible plastic, e.g. polypropylene, or glass. The column may be of a size suitable for laboratory scale or large-scale purification of antibodies. In a specific embodiment, the column according to the invention is provided with luer adaptors, tubing connectors, and domed nuts. Thus, the present invention also encompasses a kit comprised of a chromatography column packed with a separation matrix as described above; at least one buffer; and written instructions for purification of antibodies in separate compartments. In a specific embodiment, the present kit also comprises luer adaptors, tubing connectors, and domed nuts.

In a second aspect, the present invention relates to a process of preparing a matrix for separation of antibodies, which method comprises a first step of immobilising sulphonamides to a porous support, either via their amines or via the sulphur of their sulphonyl groups. In a specific embodiment, the sulphonamide ligands are prepared by immobilising amines and/or polyamines to a porous support and subsequently sulphonylating said amines. The porous support may be as described above, and any standard methods for immobilisation may be used, see e.g. Immobilized Affinity Ligand Techniques, Hermanson et al, Greg T. Hermanson, A. Krishna Mallia and Paul K. Smith, Academic Press, INC, 1992. For a specific disclosure of immobilisation of aromatic compounds, see e.g. the above-discussed U.S. Pat. No. 6,498,26 (Upfront Chromatography). However, as the skilled person in this field will realise, some of the separation matrices may equally well be prepared by immobilisation of sulphonamides directly to the support, depending on the nature of the ligand. Further, as the skilled person in this field will appreciate, the ligand density may be used to compensate for more or less hydrophobic ligands. In other words, if a highly hydrophobic ligand is selected, which may appear to be too hydrophobic to allow easy desorption of adsorbed antibody, it may be required to compensate with a slightly lower density on the support than a less hydrophobic. However, this is a common and well known situation, and the skilled person can easily adapt the ligand density appropriately be routine testing.

In a third aspect, the present invention is a method of purification of antibodies from a liquid, which method comprises the steps of (a) providing a liquid that comprises at least one antibody:

(b) contacting said liquid with a separation matrix comprising one or more sulphonamide groups to adsorb one or more antibodies to the matrix; and, optionally, (c) passing an eluent over said matrix to release one or more antibodies; and (d) recovering at least one antibody from a fraction of the eluent.

In this context, it is to be understood that the term "antibodies" also includes antibody fragments and any fusion protein that comprises an antibody or an antibody fragment. Thus, the present method is useful to isolate any immunoglobulin-like molecule, which presents the binding properties of an antibody. The liquid comprising an antibody may for example be a liquid originating from a cell culture producing antibodies or a fermentation broth, from which it is desired to purify one or more desired antibodies. Alternatively, the liquid may be blood or blood plasma, from which it is desired to remove one or more antibodies to obtain a liquid which is pure in that respect. Thus, in one embodiment of the present method, the liquid provided in step (a) also comprises one or more other proteins than antibodies. As will be shown in the experimental part below, in general, the present method allows selective adsorption of antibodies at relatively low ionic strengths. Unexpectedly, the present inventors found that the use of a porous separation matrix that exhibits one or more sulphonamide groups enables the adsorption of antibodies while other proteins than antibodies are not adsorbed. Accordingly, the present method provides pure preparations of antibodies in high yields. The skilled person in this field can easily select the optimal conditions for each sulphonamide ligand structure using routine experimentation, as will be discussed in the experimental part below. For example, it is well known in this field that properties of a separation matrix can be optimised by variation of either the nature of the gel; in this case, the R group of the sulphonamide, or the degree of substitution i.e. the ligand density on the support. The salt concentration in the adsorption buffer can also be optimised for each ligand. Thus, in one embodiment of the present invention, the adsorption of step (b) is provided at a salt concentration of about 0.25 M $Na_2SO_4$. In a specific embodiment, the ligands comprise monoamines, and step (b) is performed at a salt concentration above about 0.5 M $Na_2SO_4$.

The present method can use a separation matrix in any suitable form, such as a chromatography matrix, e.g. in the form of essentially spherical particles or a monolith; a filter or membrane; a chip or the like. Thus, in an advantageous embodiment, the separation matrix of step (b) is provided in a chromatography column.

The support and the ligands of the separation matrix of step (b) may be anyone of the ones described above.

As mentioned above, the present invention has unexpectedly shown that using the novel separation matrix according to the invention enables highly selective adsorption of antibodies at a neutral pH. Thus, in one embodiment, step (b) is performed at a pH of 6.5-8.3, such as 7.2-7.6, e.g. about 7.4.

The antibodies adsorbed to the column are easily released by standard elution such as by use of an eluent of decreasing ionic strength. Thus, in one embodiment, step (c) is a gradient elution performed by adding an eluent of decreasing salt concentration to the separation matrix, preferably by passing said eluent over the matrix. The gradient may be of any shape, such as a linear or stepwise gradient. Other elution schemes are also useful, such as adding a competitive binder in the eluent, adding to the eluent a compound that displaces the adsorbed antibodies on the matrix, such as an alcohol, a salt etc, or providing a temperature change etc.

Alternatively, the elution of step (c) is performed by an adjustment of the pH, such as a decrease or increase of pH. A pH adjustment can also be combined with a salt gradient, as discussed above. In a specific embodiment, step (b) is performed at a pH above neutral, and step (c) is a gradient elution performed by adding an eluent of decreasing pH.

The present method is useful to recover any kind of monoclonal or polyclonal antibody, such as antibodies originating from mammalian hosts, such as mice, rodents, primates and humans, or antibodies originating from cultured cells such as hybridoma cells. In one embodiment, the antibodies recovered in step (d) are human or humanised antibodies. The antibodies may be of any class, i.e. selected from the group that consists of IgA, IgD, IgE, IgG, and IgM. In a specific embodiment, the antibodies recovered in step (d) are immunoglobulin G (IgG). The present invention also encompasses the purification of fragments of any one of the above mentioned antibodies as well as fusion proteins comprising such antibodies. The isolated or purified target molecules may be useful in the medical field as antibody drugs; for example in personalised medicine where a specific drug is designed for each individual in need.

The present method allows quantitative adsorption of antibodies. Thus, in one embodiment, the present method encompasses a method as defined above and in addition a step (f) of determining the amount of antibody spectrophotometrically. Such methods and useful equipment are well known to the skilled person in this field. The present is also useful in analytical procedures, and may provide a tool in the diagnostic field.

DETAILED DESCRIPTION OF THE DRAWINGS

Figure 1:
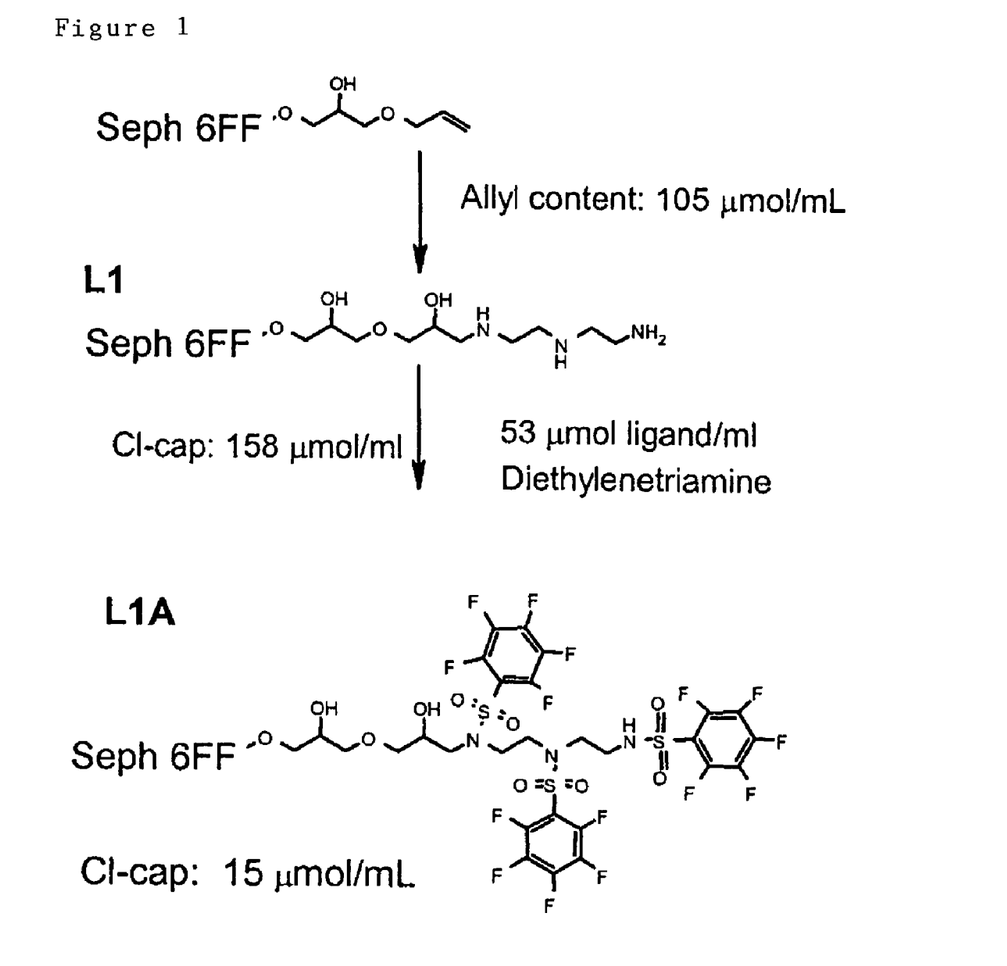
FIG. 1 shows the illustrative ligand structures of six different aromatic sulphonamide ligands according to the invention.

FIG. 1 shows the illustrative ligand structures of six different aromatic sulphonamide ligands according to the invention.

Figure 2:
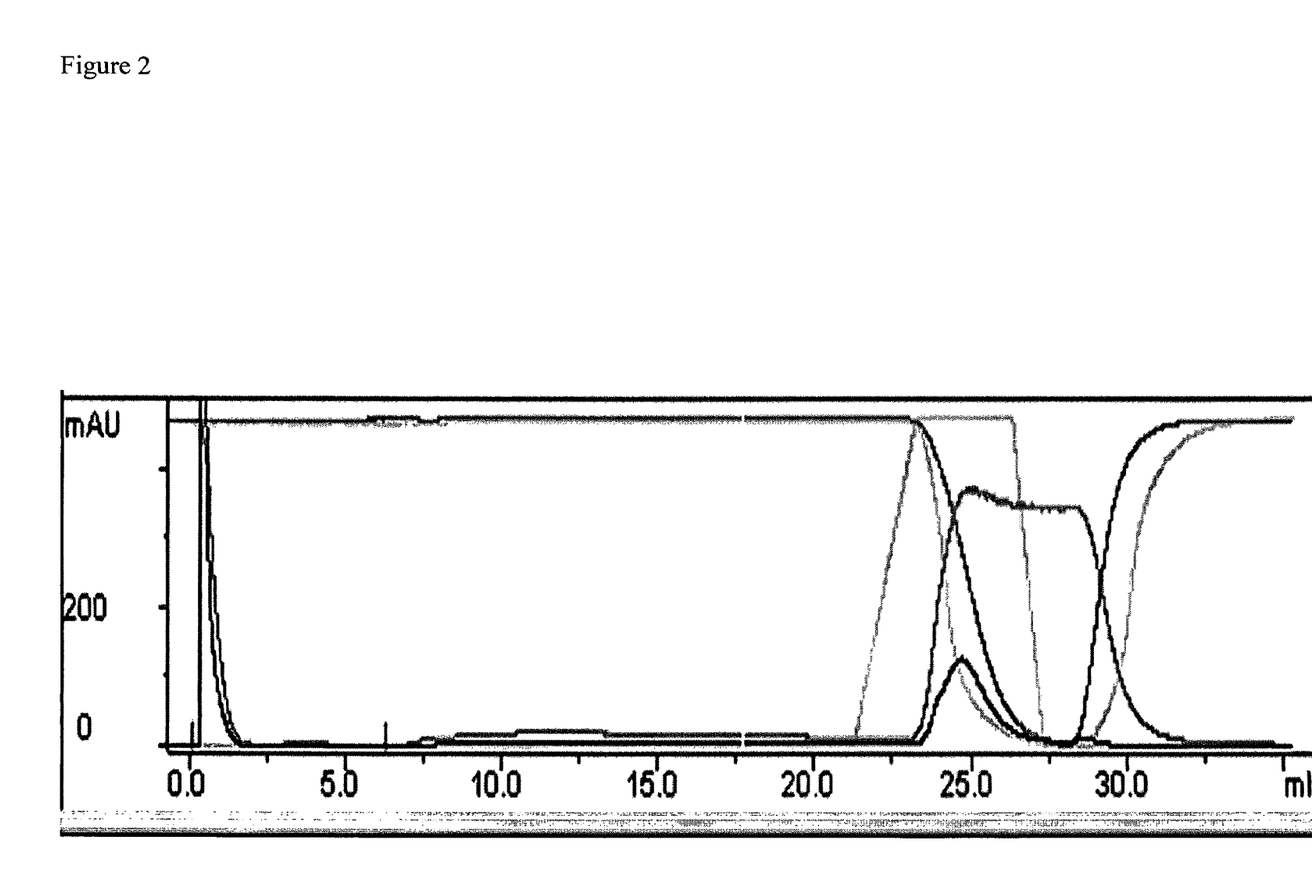
FIG. 2 is a chromatogram showing the adsorption and desorption of IgG on a prototype ligand according to the invention, as described in Example 2 of the experimental part.

FIG. 2 is a chromatogram showing the adsorption and desorption of IgG on a prototype ligand according to the invention, as described in Example 2 of the experimental part. The UV-response at 280 nm (blue line) shows that the IgG sample is adsorbed (buffer A3) and is eluted between 23-26 mL by using buffer B1. Buffer A3=20 mM phosphate buffer (pH 7.4) with 0.50 M $Na_2SO_4$ and Buffer B1=100 mM acetate buffer (pH 4.0).

Figure 3:
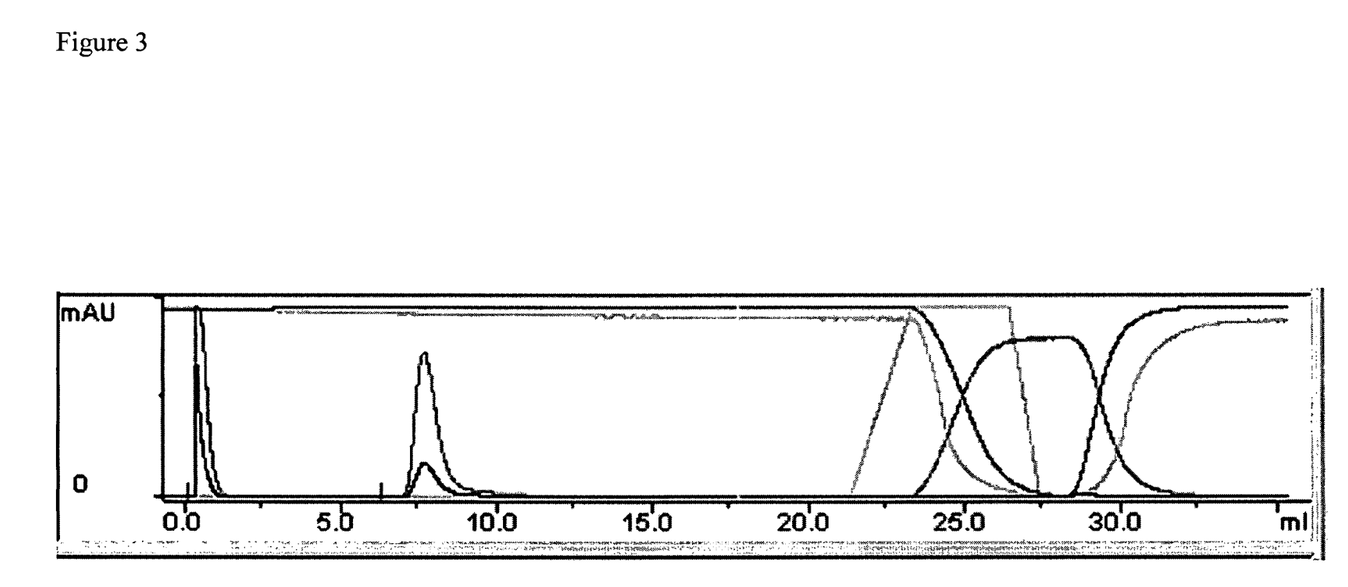
FIG. 3 is a chromatogram showing the adsorption and desorption of BSA on a prototype ligand according to the invention, as described in Example 3 of the experimental part.

FIG. 3 is a chromatogram showing the adsorption and desorption of BSA on a prototype ligand according to the invention, as described in Example 3 of the experimental part. The UV-response at 280 nm (blue line) shows that the BSA sample is not adsorbed and is eluted between 7.5-9 mL by using buffer A3. Buffer A3=20 mM phosphate buffer (pH 7.4) with 0.50 M $Na_2SO_4$ and Buffer B1=100 mM acetate buffer (pH 4.0).

Figure 4:
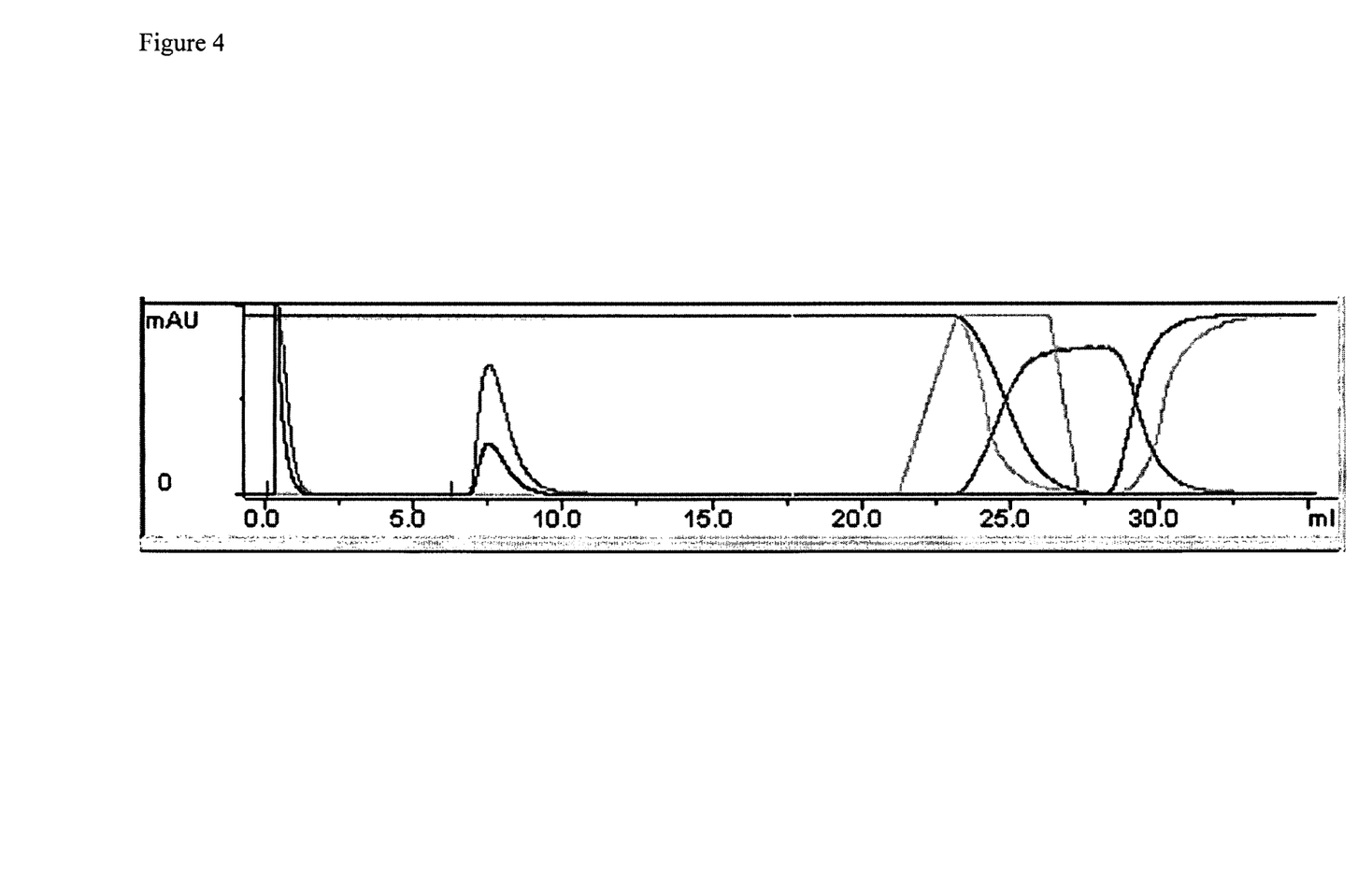
FIG. 4 is a chromatogram showing the adsorption and desorption of RIB on a prototype ligand according to the invention, as described in Example 4 of the experimental part.

FIG. 4 is a chromatogram showing the adsorption and desorption of RIB on a prototype ligand according to the invention, as described in Example 4 of the experimental part. The UV-response at 280 nm (blue line) shows that the RIB sample is not adsorbed and is eluted between 7.5-9 mL by using buffer A3. Buffer A3=20 mM phosphate buffer (pH 7.4) with 0.50 M $Na_2SO_4$ and Buffer B1=100 mM acetate buffer (pH 4.0).

Figure 5:
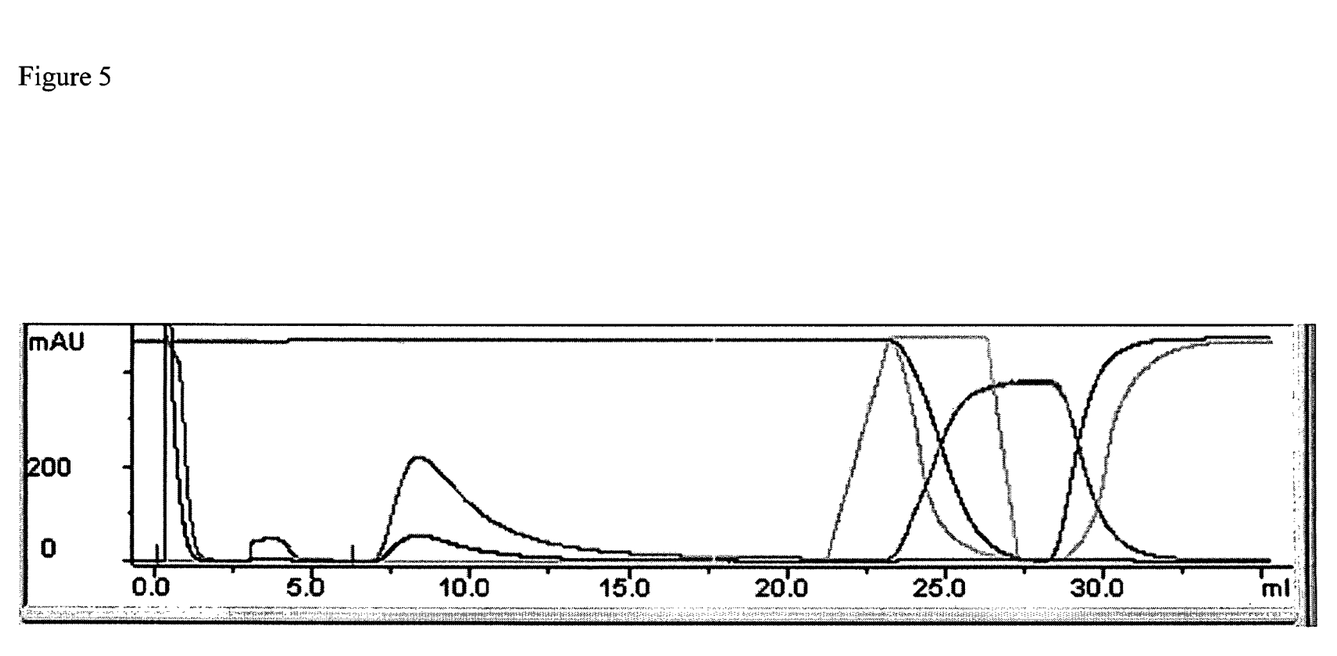
FIG. 5 is a chromatogram showing the adsorption and desorption of TRANSF on a prototype ligand according to the invention, as described in Example 5 of the experimental part.

FIG. 5 is a chromatogram showing the adsorption and desorption of TRANSF on a prototype ligand according to the invention, as described in Example 5 of the experimental part. The UV-response at 280 nm (blue line) shows that the TRANSF sample is not adsorbed and is eluted between 7.5-9 mL by using buffer A3. Buffer A3=20 mM phosphate buffer (pH 7.4) with 0.50 M $Na_2SO_4$ and Buffer B1=100 mM acetate buffer (pH 4.0).

Experimental Part

The present examples are provided for illustrative purposes only, and should not be construed as limiting the scope of the present invention as defined by the appended claims. All references given below and elsewhere in the present specification are hereby included herein by reference.

EXAMPLE 1

Preparation of Sulphonamide Separation Matrixes

Provided below is the preparation of various separation matrices according to the invention, wherein the R group of the sulphonyl part comprises aromatic groups.

General

Volumes of matrix refer to settled bed volume.

Weights of matrix given in gram refer to suction dry weight. It is understood that these matrices are still water solvated material.

For large scale reaction stirring is referring to a suspended, motor-driven stirrer since the use of magnet bar stirrer is prompt to damage the beads. Small-scale reactions (up to 20 ml or g of gel) were performed in closed vials and stirring refers to the use of a shaking table.

Conventional methods were used for the analysis of the functionality and the determination of the degree of allylation, or the degree of substitution of ion exchanger groups on the beads. These methods were eventually complemented by additional elementary analysis of the gels in particular for sulphur atom.

One way to prepare a separation matrix according to the invention is exemplified below, starting from a cross-linked agarose gel (Sepharose™ 6 FF, Amersham Biosciences, Uppsala, Sweden). For each step, a specific example is described.

A. Introduction of Allyl Group on the Matrix

Sepharose™ was modified with allyl glycidyl ether as follows:

1) A 200 ml of Sepharose™ 6 FF was mixed with 0.2 g of $NaBH_4$, 24 g of $Na_2SO_4$, 8 g of a 50% aqueous solution of NaOH and 40 ml of water. The mixture was stirred for 1 hour at 50° C. Allylglycidyl ether (100 ml) was added and the suspension was left at 50° C. under vigorous stirring for an additional 18 hours. After neutralisation with successive additions of 5M AcOH till a pH of 7 was reached, the mixture was filtered and the gel was washed successively, with 1 L ethanol, 2 L distilled water, 400 ml 0.2 M acetic acid and, 500 ml distilled water.

Titration gave a degree of substitution of 0.124 mmol of allyl/ml of gel.

2) A 225 ml of Sepharose™6 FF was mixed with 0.22 g of NaBH$_4$, 7.2 g of a 50% aqueous solution of NaOH and 110 ml of water. The mixture was stirred for 1 hour at 30° C. Allylglycidyl ether (61.8 ml) was added and the suspension was left at 30° C. under vigorous stirring for an additional 17 hours. After neutralisation with successive additions of 5M AcOH till a pH of 7 was reached, the mixture was filtered and the gel was washed successively, with 1 L ethanol, 2 L distilled water, 400 ml 0.2 M acetic acid and, 500 ml distilled water.

Titration gave a degree of substitution of 0.042 mmol of allyl/ml of gel.

B. Introduction of Amines Groups on the Matrix

The amines groups were introduced on the matrix directly via the nitrogen atom of the amine groups. The coupling to the matrix was realised via bromination of the allyl group and nucleophilic substitution under basic conditions.

Activation of Allyl Sepharose™ Via Bromination

Bromine was added to a stirred suspension of 100 ml of Sepharose™ 6 FF allylated as described above (0.042 or 0.124 mmol allyl groups/ml drained gel), 4 g of AcONa and 100 ml of distilled water, until a persistent yellow colour was obtained. Sodium formate was then added till the suspension was fully decolourised. The reaction mixture was filtered and the gel washed with 500 ml of distilled water. The activated gel was then directly transferred to a reaction vessel and further reacted with the appropriate ligand.

Diethylenetriamine Sepharose™

A 30 g quantity of bromine-activated gel (0.124 mmol allyl groups/ml drained gel) was transferred to a reaction vial containing a solution of diethylenetriamine (24 ml) and water (10 ml) that had been adjusted to pH 12 by addition of small amount of 6 M HCl. The reaction was left 20 hours under stirring at 50° C. After filtration of the reaction mixture the gel was successively washed with 3×30 ml of distilled water, 3×30 ml aqueous 0.5 HCl and finally 3×30 ml of distilled water. The resulting diethylenetriamine Sepharose™ gel was obtained with a degree of substitution 0.158 mmol amines/ml of gel.

Ammonia Sepharose™

1) A 33 g quantity of bromine-activated gel (0.124 mmol allyl groups/ml drained gel) was transferred to a reaction vial containing a solution of sodium azide (2 g) in water (10 ml) that had been adjusted to pH 12.3 by addition of a few drops of 50% aqueous solution of NaOH. The reaction was left 20 hours under stirring at 50° C. After filtration of the reaction mixture the gel was successively washed with 3×60 ml of distilled water and 3×30 ml DMF. The drained gel was then treated with a solution of DTE (4.5 g) and DBU (3.75 ml) in DMF (22 ml) and the mixture stirred for 18 h at room temperature. After filtration of the reaction mixture the gel was successively washed with 3×30 ml DMF, 3×30 ml ethanol and finally 3×30 ml of distilled water The amine-Sepharose™ gel was obtained with a degree of substitution 0.083 mmol amine group/ml of gel.

2) A 6 g quantity of bromine activated gel (0.042 mmol allyl groups/ml drained gel) was transferred to a reaction vial containing a solution of sodium azide (84 mg) in water (3 ml) that had been adjusted to pH 12.2 by addition of a few drops of 50% aqueous solution of NaOH. The reaction was left 17 hours under stirring at 50° C. After filtration of the reaction mixture the gel was successively washed with 3×20 ml of distilled water and 3×10 ml DMF. The drained gel was then treated with a solution of DTE (0.86 g) and DBU (0.8 ml) in DMF (5 ml) and the mixture stirred for 18 h at room temperature. After filtration of the reaction mixture the gel was successively washed with 3×10 ml DMF, 3×10 ml ethanol and finally 3×10 ml of distilled water The amine-Sepharose™ gel was obtained with a degree of substitution 0.026 mmol amine group/ml of gel.

C. Derivatization of the Amines Groups with Aryl Sulphonyl Chloride Derivatives

General Method

A 5 g quantity of amine coupled gel was washed with 10 ml of 0.2 M aq. NaOH, 3×10 ml ethanol followed by 3×10 ml DCM (dichloromethane). The gel was transferred to a vial and DCM (2 ml) and 3.3 equivalents of DIPEA were as well added, and the mixture stirred for 5 minutes. After dropwise addition of 3 equivalents of the aryl sulphonyl chloride dissolved in DCM (3 ml), the reaction mixture was stirred at room temperature for 18 h.

After filtration of the reaction mixture the gel was successively washed with 3×10 ml DCM, 3×10 ml ethanol, 3×10 ml of distilled water, 3×10 ml 0.5M HCl and finally 3×10 ml of distilled water.

N,N',N"-Tris(Pentafluorobenzenesulphonyl)diethylenetriamine Sepharose™

Following the general procedure, treatment of the diethylenetriamine Sepharose™ gel (0.158 mmol amines/ml of gel) with pentafluorobenzenesulphonyl chloride (355 µl) gave the title prototype, which was denoted L1A in FIG. 1.

N,N',N"-Tris(4-Nitrobenzenesulphonyl)diethylenetriamine Sepharose™

Following the general procedure, treatment of the diethylenetriamine Sepharose™ gel (0.158 mmol amines/ml of gel) with 4-nitrobenzenesulphonyl chloride (540 mg) gave the title prototype, which was denoted L1B in FIG. 1.

N,N',N"-Tris(p-Toluenesulphonyl)diethylenetriamine Sepharose™

Following the general procedure, treatment of the diethylenetriamine Sepharose™ gel (0.158 mmol amines/ml of gel) with p-toluenesulphonyl chloride (460 mg) gave the title prototype, which was denoted L1C in FIG. 1.

Pentafluorobenzenesulphonamide Sepharose™

Following the general procedure, treatment of the ammonia Sepharose™ gel (0.083 mmol amines/ml of gel) with pentafluorobenzenesulphonyl chloride (200 µl) gave the title prototype, which was denoted L2A in FIG. 1.

4-Nitrobenzenesulphonamide Sepharose™

Following the general procedure, treatment of the ammonia Sepharose™ gel (0.083 mmol amines/ml of gel) with 4-nitrobenzenesulphonyl chloride (290 mg) gave the title prototype, which was denoted L2B in FIG. 1.

p-Toluenesulphonamide Sepharose™ (L2C)

1) Following the general procedure, treatment of the ammonia Sepharose™ gel (0.026 mmol amines/ml of gel) with p-toluenesulphonyl chloride (207 mg) gave the title prototype (low substitution), denoted L2Ca in the experimental part.

2) Following the general procedure, treatment of the ammonia Sepharose™ gel (0.083 mmol amines/ml of gel) with p-toluenesulphonyl chloride (207 mg) gave the title prototype (high substitution), denoted L2Cb in the experimental part.

EXAMPLES 2-5

Chromatographic Evaluation

Materials and Method (General)

To test if the aromatic sulphonamide ligands according to the present invention adsorb human immunoglobulin (IgG), the adsorptivity of IgG and three different proteins was tested at different conditions. In addition, one monoclonal antibody was also tested. The principle of the test method is that proteins are injected (15 µl) into an HR5/5 column, containing the sulphonamide ligands immobilized on Sepharose™ 6 Fast Flow, equilibrated with the A-buffer containing a salt and a buffer component. Fifteen ml of A-buffer is then pumped through the column; then a 5-ml linear gradient from A-buffer to B-buffer, with B-buffer containing buffer component without salt, is applied (see UNICORN method below). The chromatographic profiles are then monitored at 280, 254 and 215 nm.

To evaluate the amount of sample adsorbed and amount of sample eluted from the column the same amount of sample as applied to the column was also injected directly to the monitor and the response was integrated.

Experimental

Three different adsorption buffers (Buffer A#) and two different desorption buffers (Buffer B#) were used:

Buffer A1: 20 mM phosphate buffer (pH 7.4) with 0.25 M NaCl
Buffer A2: 20 mM phosphate buffer (pH 7.4) with 0.25 M $Na_2SO_4$
Buffer A3: 20 mM phosphate buffer (pH 7.4) with 0.50 M $Na_2SO_4$
Buffer B1: 100 mM acetate buffer (pH 4.0)
Buffer B2: 100 mM acetate buffer (pH 4.0)+20% (v/v) isopropanol Sample The samples used were bovine serum albumin (BSA), ribonuclease A (RIB A), transferrin (TRANSF) and human immunoglobulin (IgG, Gammanorm, Pfizer). The proteins were dissolved in the A-buffers at a concentration of 15 mg/ml and only one protein at a time was applied to the column.

Media with the ligand L2C has also been produced with the ligand density adjusted to 26 µmol/mL (L2Ca) and 16 µmol/mL (L2Cb).

Instrumental

Apparatus (Amersham Biosciences, Uppsala, Sweden)
LC System: ÄKTA™ Explorer 10 XT
Software: UNICORN™
Injection loop: Superloop 15 µl
Column: HR 5/5
Instrument Parameters
Flow rate: 0.5 ml/min
Detector cell: 10 mm
Wavelength: 280, 254 and 215 nm
UNICORN Method
Main method:

| mL | |
|---|---|
| 0.00 | BaseCV,1.00{ml},Any |
| 0.00 | Column Position Position 1 Bypass |
| 0.00 | AutoZeroUV |
| 0.00 | Wavelength 280 {nm} 254 {nm} 215 {nm} |
| 1.00 | Wavelength 280 {nm} 254 {nm} 215 {nm} |

-continued

| mL | |
|---|---|
| 1.10 | Injection Partial (1)#VIAL, 10#INJVOL1 {µl}, No, NoAir Sample injection directly into the monitor |
| 1.10 | AutoZeroUV |
| 4.00 | Column Position (Position 2) |
| 7.00 | Injection Partial (1)#VIAL 2, 10#INJVO2 {µl}, No, NoAir Sample injection into the column |
| 22.00 | Gradient100{%B},2.00{base}ElutionwithbufferB |
| 27.00 | Gradient100{%B},0.00{base} |
| 27.10 | Gradient 0 {% B}, 1 {base} Equilibration with buffer A |
| 31.00 | Gradient 0 {% B}, 0 {base} |
| 36.00 | Gradient 0 {% B}, 0 {base} |
| 36.10 | End method |

EXAMPLE 2

IgG Adsorption to L2Ca

To document if aromatic sulphonamides adsorb immunoglobulin, human IgG has been applied to a 1 ml column (HR 5/5) packed with the new separation matrix according to the invention. In this example, adsorption and desorption of IgG on a low ligand density variant of prototype L2C, herein denoted L2Ca, was tested according to the main method. L2Ca was prepared as described in Example 1 above, and its ligand density was 26 µmol/mL.

Adsorption of IgG was tested with buffer A3 (20 mM phosphate buffer, pH 7.4, with 0.50 M $Na_2SO_4$). It was found that IgG was adsorbed to L2Ca when buffer A3 was used. As appears from FIG. 2, IgG adsorbed to L2Ca using buffer A3 could easily be eluted between 23-26 mL with 100 mM acetate buffer (pH 4.0) with no salt added. Adsorption of IgG using buffer A3 as mobile phase resulted in a recovery of about 100% of the adsorbed IgG when desorption buffer B1 was used.

EXAMPLES 3-5

Protein Adsorption to L2Ca

In the following examples, the interaction was examined of bovine serum albumin (BSA), ribonuclease A (RIB A) and transferrin (TRANSF) with the aromatic sulphonamide ligands L2Ca.

One of the most important characteristics of a ligand aimed for purification of monoclonal antibodies is the selectivity. Therefore, in addition to IgG, the adsorption of the proteins bovine serum albumin (BSA), ribonuclease A (RIB A) and transferrin (TRANSF) to L2Ca were also investigated, at the conditions used above for adsorption of IgG.

EXAMPLE 3

Bovine Serum Albumin (BSA)

In this example, desorption and desorption of BSA on L2Ca, prepared as described above (26 µmol/mL), were tested according to the main method. As appears from FIG. 3, the UV-response at 280 nm (blue line) shows that the BSA sample is not adsorbed and is eluted between 7.5-9 mL by using buffer A3. Buffer A3=20 mM phosphate buffer (pH 7.4) with 0.50 M $Na_2SO_4$ and Buffer B1=100 mM acetate buffer (pH 4.0).

EXAMPLE 4

Ribonuclease A (RIB A)

In this example, the adsorption and desorption of RIB on L2Ca, prepared as described above (26 µmol/mL), were tested according to the main method. As appears from FIG. 4, the UV-response at 280 nm (blue line) shows that the RIB sample is not adsorbed and is eluted between 7.5-9 mL by using buffer A3. Buffer A3=20 mM phosphate buffer (pH 7.4) with 0.50 M $Na_2SO_4$ and Buffer B1=100 mM acetate buffer (pH 4.0).

EXAMPLE 5

Transferrin (TRANS)

In this example, the adsorption and desorption of TRANSF on L2Ca, prepared as described above (26 µmol/mL), were tested according to the main method. As appears from FIG. 5, the UV-response at 280 nm (blue line) shows that the TRANSF sample is not adsorbed and is eluted between 7.5-9 mL by using buffer A3. Buffer A3=20 mM phosphate buffer (pH 7.4) with 0.50 M $Na_2SO_4$ and Buffer B1=100 mM acetate buffer (pH 4.0).

The invention claimed is:

1. A separation matrix comprised of a porous support and ligands immobilized thereon, optionally via spacer arms, wherein the ligands comprise one or more aromatic sulphonamides and are substantially devoid of protonatable groups.

2. The matrix of claim 1, wherein the nitrogen of the sulphonamide is a primary or secondary amine.

3. The matrix of claim 1, wherein the ligands are monoamines.

4. The matrix of claim 1, wherein the ligands are polyamines.

5. The matrix of claim 4, wherein each polyamine comprises two to six amines.

6. The matrix of claim 1, wherein the ligands are present as repetitive units of a polymer immobilised to the support.

7. The matrix of claim 6, wherein the polymer is a polyethylene imine.

8. The matrix of claim 6, wherein the polymer exhibits two or more different ligand groups.

9. The matrix of claim 1, wherein the support is a cross-linked polysaccharide.

10. A chromatography column packed with the separation matrix of claim 1.

* * * * *